United States Patent [19]
Ingham et al.

[11] Patent Number: 5,165,223
[45] Date of Patent: Nov. 24, 1992

[54] PROCESS FOR STARTING A GAS TURBINE AND GAS TURBINE

[75] Inventors: Peter C. Ingham, El Cajon; Sven B. Sjoberg, San Diego; Gary P. Vavrek, San Diego; Gary L. Goldberg, San Diego; William D. Treece, La Mesa, all of Calif.

[73] Assignee: Sundstrand Corporation, Rockford, Ill.

[21] Appl. No.: 624,555

[22] Filed: Dec. 10, 1990

[51] Int. Cl.⁵ .............................................. F02C 7/26
[52] U.S. Cl. ................................ 60/39.06; 60/39.141
[58] Field of Search .......... 60/39.141, 39.142, 39.06, 60/39.281; 364/431.02

[56] References Cited

U.S. PATENT DOCUMENTS

| | | | |
|---|---|---|---|
| 2,923,129 | 2/1960 | Schwede | 60/39.281 |
| 3,292,367 | 12/1966 | Bauger et al. | 60/39.141 |
| 3,520,133 | 7/1970 | Loft et al. | 60/39.141 |
| 3,600,887 | 8/1971 | Gault et al. | 60/39.141 |
| 3,662,545 | 5/1972 | Davis | 60/39.141 |
| 3,688,495 | 9/1972 | Fehler et al. | 60/39.28 |
| 3,793,826 | 2/1974 | Hollenboom et al. | 60/39.142 |
| 3,798,901 | 3/1974 | Lewenhaupt | 960/39.281 |
| 3,902,315 | 9/1975 | Martin | 60/39.14 |
| 4,015,426 | 4/1977 | Hobo et al. | 60/39.28 R |
| 4,380,984 | 4/1983 | Nagai et al. | 123/440 |
| 4,454,713 | 6/1984 | Meyer et al. | 60/39.281 |
| 4,464,895 | 8/1984 | Morrison et al. | 60/39.141 |
| 4,509,325 | 4/1985 | Morgan et al. | 60/39.141 |

Primary Examiner—John J. Vrablik
Assistant Examiner—Michael I. Kocharov
Attorney, Agent, or Firm—Antonelli, Terry Stout & Kraus

[57] ABSTRACT

A method of starting a gas turbine (10) having a combustor (12) and a fuel supply system (14) supplying fuel to the combustor in accordance with the invention includes turning on a fuel valve (40) to control fuel flow to the combustor for combustion after a first starting condition (100) is reached; and cyclically turning (116) the main fuel valve on and off when a sensed exhaust gas temperature (114) initially reaches a first set temperature and continuing to cyclically turn the main fuel valve on and off until the sensed exhaust gas temperature falls to a second set temperature (118) lower than the first set temperature or until a second starting condition (102) is reached.

27 Claims, 4 Drawing Sheets

PROCESS FOR STARTING A GAS TURBINE AND GAS TURBINE

TECHNICAL FIELD

The present invention relates to a starting system for a gas turbine and a method of starting a gas turbine.

BACKGROUND ART

FIG. 1 illustrates a prior art gas turbine of the type manufactured by the Assignee of the present invention for applications as an auxiliary power unit (APU) in airframes. The gas turbine 10 has a combustor 12 which combusts fuel supplied by a fuel system 14 to produce high pressure gas driving turbine rotor 16. A compressor 18 compresses gas which is applied to gas supply lines which extend between the exhaust stream, the start bypass valve 19 and the bleed value 19'. The rotor 16 also drives an alternator 20 and fuel pump 22 of the fuel system 14. Fuel lines are indicated by lines containing spaced circles. Igniter 22', which is activated by an exciter 24, is used in the starting of combustion within the combustor 12. Motor starter 26 is used for starting the turbine 10. The rotational speed of the turbine rotor 16 is sensed by speed sensor 28. Thermocouple 30 senses the exhaust gas temperature (EGT). An electronic sequence unit 32 controls the overall opening and closing of valves in the system with the section at a 6 o'clock position indicating a normally closed position. Memory 34 stores and displays the number of hours that the turbine has been operated and the number of times that the turbine has been started.

The fuel system 14 is comprised of a solenoid controlled start fuel valve 36; a solenoid controlled maximum fuel valve 39 for supplying extra fuel to the combustor to drive a maximum load and a solenoid controlled main fuel valve 40 which supplies fuel to the combustor during normal operation. The section of the valve 39 at the 12 o'clock position and the section of the valve 40 at the 6 o'clock position is normally closed. Each of the solenoid controlled fuel valves 36, 39 and 40 have either an on state in which fuel flow is unrestricted or an off state in which no fuel is passed by the solenoid controlled valve. The solenoid controlled valves 36, 39 and 40 do not proportionally meter the fuel flow with only an on maximum fuel flow and an off fuel flow being possible. In the prior art system of FIG. 1, the main fuel valve 40 during starting is not cyclically turned on and off and is not controlled as a function of temperature.

The turbine 10 utilized in an APU is required to start in extremely cold conditions which are present when an airframe is operating at high altitude and also in cold climates. In order to obtain reliable and fast starting, it is necessary to raise the combustion temperature within the combustor 12 during rotation of the turbine at a specified operational range typically between 10% and 50% of maximum shaft speed. Starting a gas turbine in extreme cold, such as at high altitude, is extremely difficult in the prior art with a significant degree of unreliability being present during each attempt to start the turbine. In extremely cold conditions, even though thermocouple 30 signals a rise in the exhaust gas temperature, there is not a corresponding acceleration of the rotor 16 of the turbine as sensed by the speed sensor 28. It is likely that combustion is occurring in the exhaust stream outside the combustor 12. This results in a situation where a malfunction in starting could arise. Furthermore, the electronic sequence unit 32 disables the flow of fuel to the combustor 12 when the sensed exhaust gas temperature sensed by thermocouple 30 rises above a predetermined maximum temperature, such as during hot starting conditions, which is a temperature at which damage to the combustor 12 and/or turbine 16 would occur by sustained operation. The prior art turbine starting sequences controlled by the electronic sequence unit 32 during hot starting conditions have the deficiencies of either having extremely high exhaust gas temperature with the concomitant damage to the combustor 12 and/or turbine wheel 16 or had high temperature shut downs.

FIGS. 2A and B illustrate a block diagram of the electronic sequence unit 32 of FIG. 1. Functional blocks are labelled. The electronic sequence unit 32 is microprocessor controlled by a program stored in memory.

U.S. Pat. Nos. 3,688,495, 4,015,426, 4,454,713 and 4,464,895 disclose the pulsing of fuel flow to a gas turbine.

DISCLOSURE OF INVENTION

The present invention is a method of starting a gas turbine and a gas turbine in which fuel flow from the fuel system is cycled by a main fuel valve between on and off states during the starting sequence of the gas turbine after a first starting condition has occurred and a sensed exhaust gas temperature has reached a first set temperature when the sensed exhaust gas temperature is between the first set temperature and a second set temperature lower than the first temperature or until a second starting condition is reached. The first starting condition is the occurrence of a set sensed exhaust gas temperature and a sensed rotational speed of the rotor of the turbine and the second starting condition is a sensed rotational speed of the rotor of the turbine which is above the first sensed rotational speed of the turbine. The first sensed rotational speed is a fraction of the normal operating rotational speed, such as but not limited to 14% and the second sensed rotational speed of the turbine is a fraction of the normal operating rotational speed of the turbine, such as but not limited to 50%. If the sensed exhaust gas temperature exceeds a maximum temperature during the starting sequence, the main fuel valve is shut off to reduce the flow of fuel to the combustor of the gas turbine to avoid damage caused by excessive temperature and the start fuel valve is maintained open to prevent flame out.

The present invention eliminates the prior art problems of unreliable cold starts and further provides reliable starts when the ambient temperature is hot. With regard to cold starting, the main fuel valve is cycled on and off while the sensed exhaust gas temperature is between two set temperatures below the maximum set temperature at which the turbine may be safely operated in a starting sequence. As a result, the starting sequence will be prolonged until the sensed rotational speed of the turbine rotor reaches the limit at which a subsequent portion of the starting sequence is begun, thus improving the reliability of the starting sequence for cold start conditions, such as those which occur at high altitude and further avoiding a rapid rise in actual exhaust gas temperature produced by combustion outside of the combustor which results in unreliable acceleration of the turbine rotor thus preventing entry into the subsequent portion of the prior art starting sequence. Furthermore, the cycling of the main fuel valve on and off during hot starting lowers the exhaust gas temperature into a temperature window which precludes shut down from a sensed exhaust gas temperature exceeding the maximum permissible exhaust gas temperature at which the turbine may be operated which results in more reliable hot starting. Finally, controlling the exhaust gas temperature within a temperature window by cycling the main fuel valve on and off may provide longer life of the turbine and combustor by preventing excessive temperatures and lowering thermal stress resultant from over temperature conditions as in the prior art.

The present invention may be implemented in an electronic sequence unit by changing the programmed sequence of operation stored in memory for execution by a microprocessor such as that illustrated in FIG. 2 discussed above.

A method of starting a gas turbine having a combustor and fuel supply system supplying fuel to the combustor in accordance with the invention includes turning on a fuel valve to control fuel flow to the combustor for combustion after a first starting condition is reached; and cyclically turning the fuel valve on and off when a sensed exhaust gas temperature initially reaches a first set temperature and continuing to turn the fuel valve on and off until the sensed exhaust gas temperature falls to a second set temperature lower than the first set temperature or until a second starting condition is reached. Prior to turning on the fuel valve a starting fuel valve is turned on and an igniter is activated to initiate combustion in the combustor; the first starting condition is a first set speed of rotation of a rotor of the turbine and a third set temperature which is less than the second set temperature; and the second starting condition is a second set speed of rotation which is greater than the first speed of rotation. When the sensed exhaust temperature falls below the second set temperature, the cyclically turning on and off of the fuel valve is stopped and the fuel valve is turned continually on until the sensed exhaust gas temperature again rises to the first set temperature at which time the fuel valve is again turned on and off until the sensed exhaust gas temperature falls to the second set temperature or the second starting condition is reached. The fuel valve is turned off when a sensed exhaust gas temperature reaches a maximum set temperature at which the turbine may be operated. The second starting condition is when a second set speed of rotation is reached. The set speed of rotation during the second starting condition is less than a speed at which the turbine is operated after starting.

A gas turbine including a combustor and fuel supply system in accordance with the present invention includes a controller for controlling starting of the gas turbine, the controller controlling turning on of a fuel valve to control fuel flow to the combustor for combustion after a first starting condition is reached and controlling cycling of the fuel valve on and off when a sensed exhaust gas temperature initially reaches a first set temperature and controlling cycling of the fuel valve on and off until the sensed exhaust gas temperature either falls to a second set temperature lower than the first set temperature or until a second starting condition is reached. The controller, prior to turning on the fuel valve, controls turning on a starting valve and an igniter in the combustor; and the first starting condition is a first set speed of rotation of a rotor of the turbine and a third set temperature which is less than the second set temperature. The controller controls the cycling on and off of the fuel valve to stop when the sensed exhaust gas temperature falls below the second set temperature and controls the fuel valve to be continually on until the sensed exhaust gas temperature again either rises to the first set temperature at which time the controller controls the fuel valve to again be turned on and off or until the second starting condition is reached. The second starting condition is when a second set speed of rotation is sensed by a sensor which is communicated to the controller. The controller controls the fuel valve to turn off when a sensed exhaust gas temperature reaches a maximum set temperature at which the turbine may be operated. The second set speed of rotation is greater than the first set speed of rotation. The second set speed of rotation of the second starting condition is a speed less than a speed at which the turbine is operated after starting.

BEST MODE FOR CARRYING OUT THE INVENTION

Figure 1:
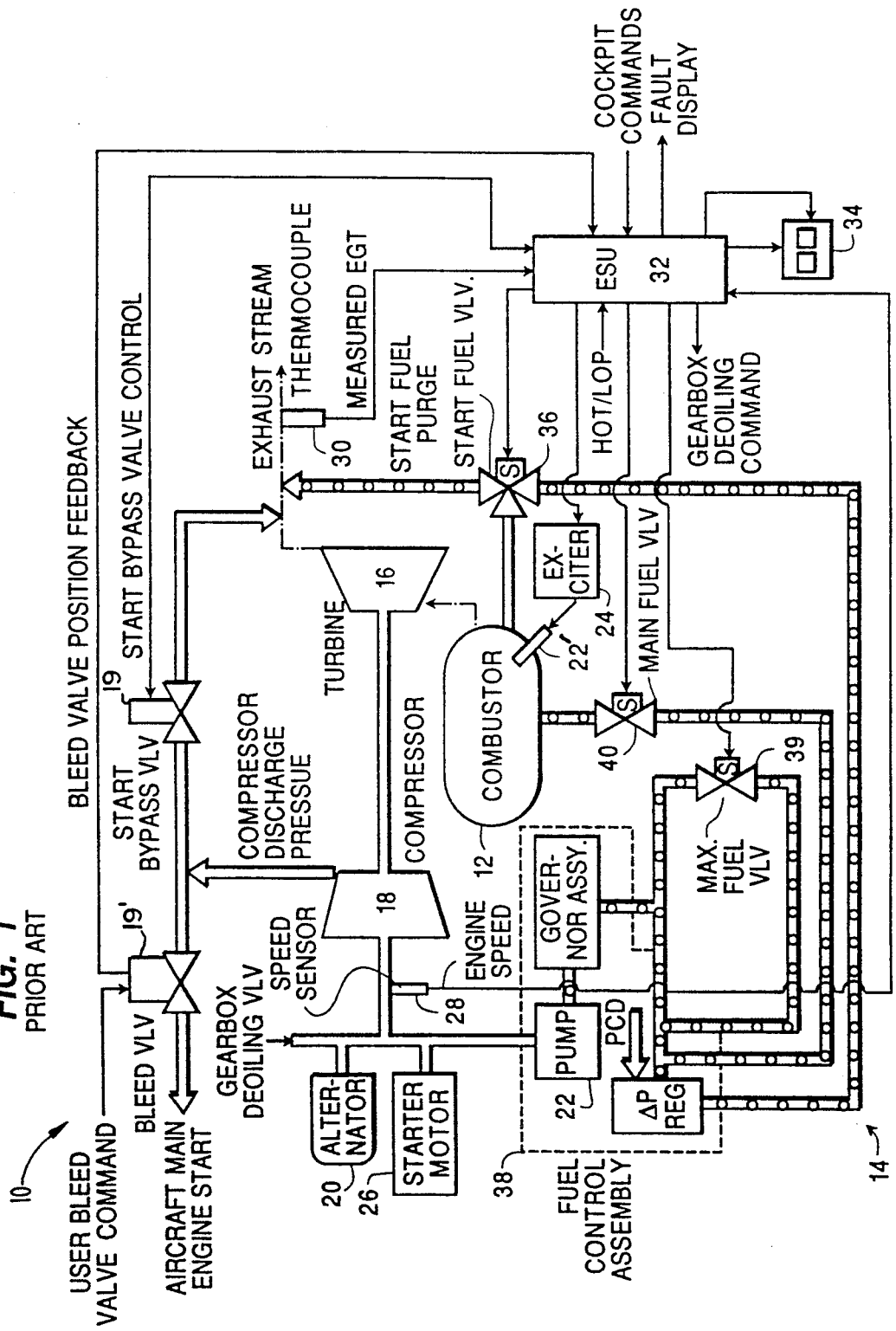
FIG. 1 illustrates a block diagram of a prior art gas turbine utilized in an auxiliary power unit of the type manufactured by the assignee of the present invention.
Figure 2A:
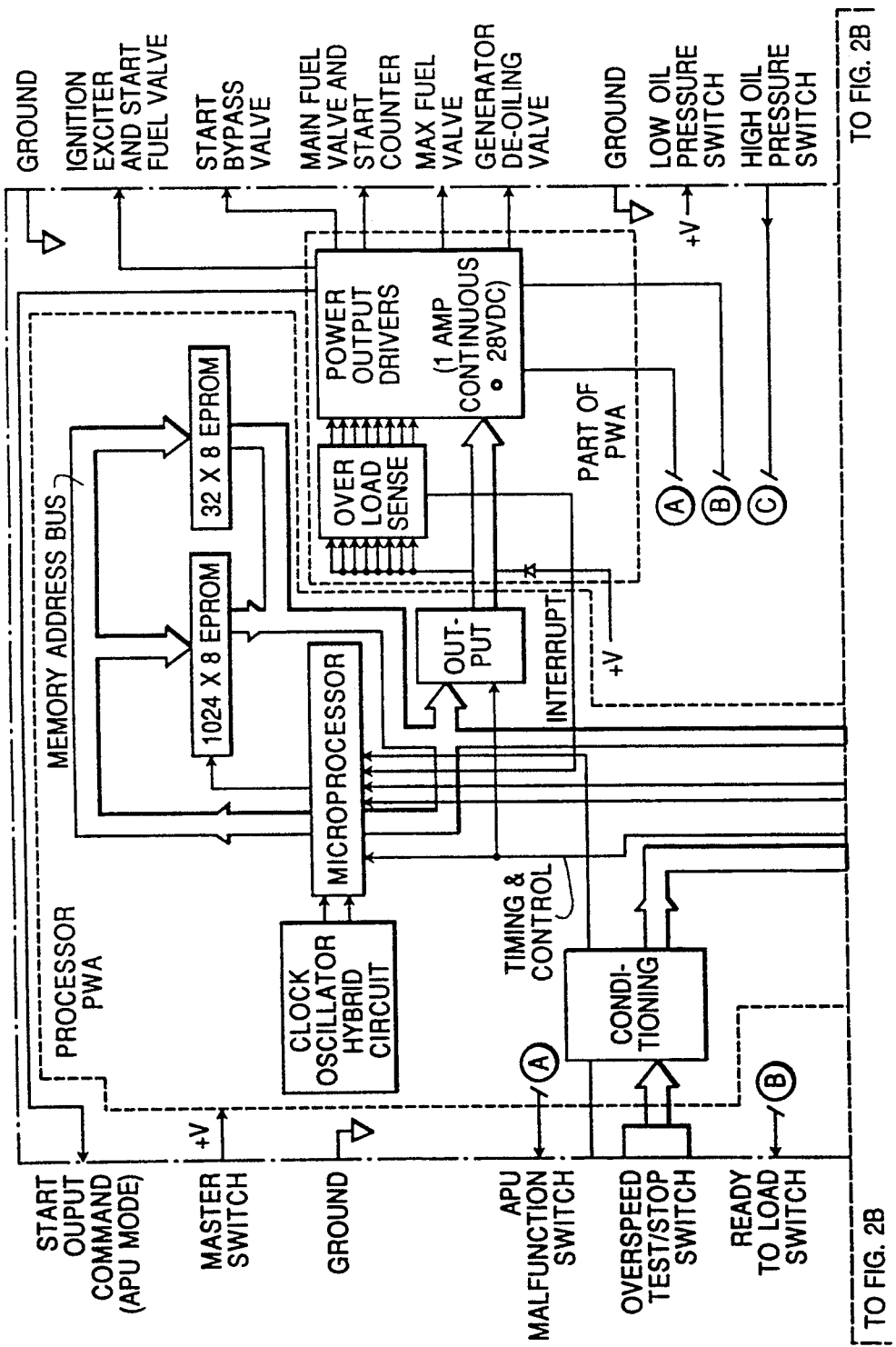
FIG. 2 illustrates a block diagram of a prior art electronic sequence unit of the type illustrated in FIG. 1.
Figure 2B:
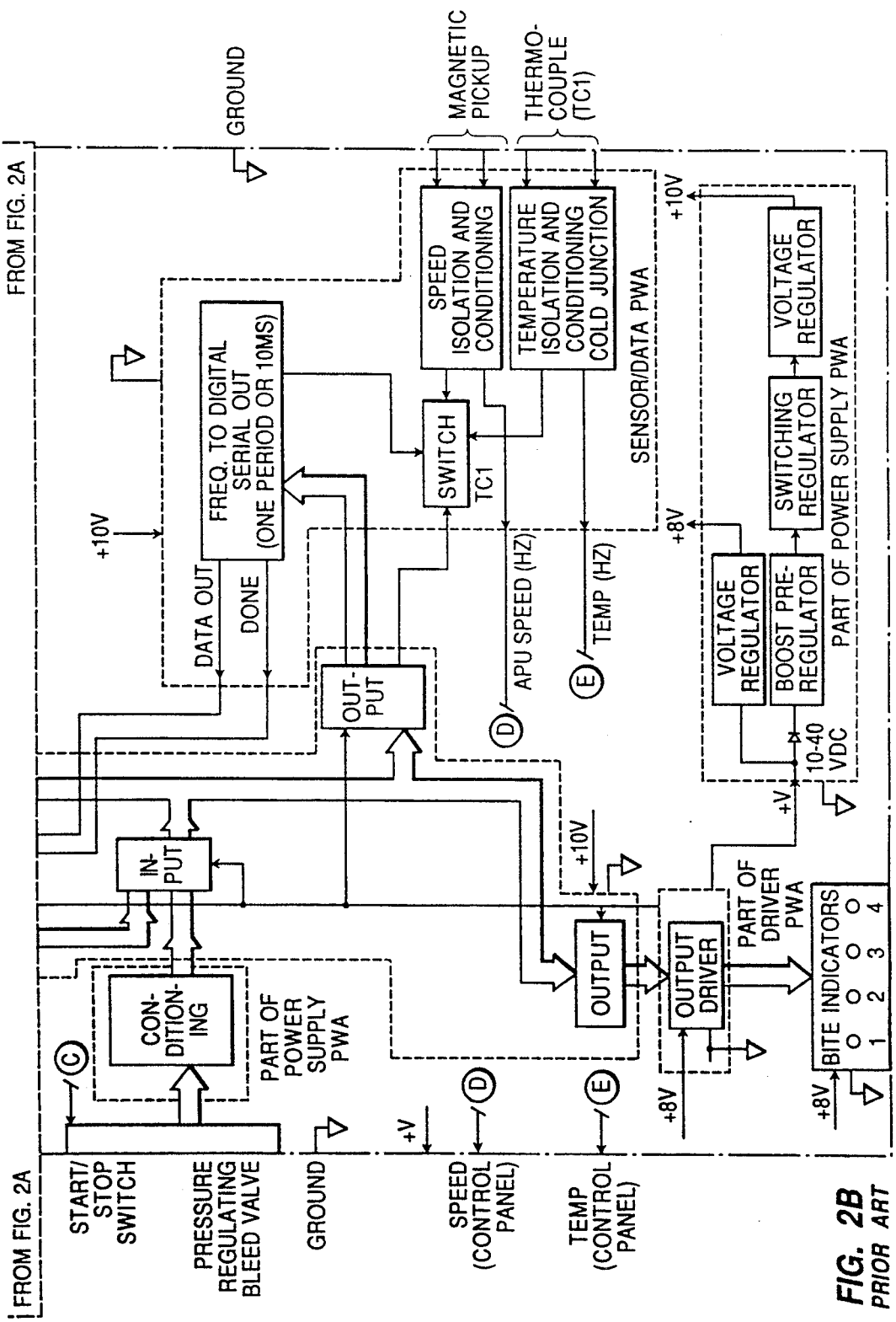

A method of starting a gas turbine in accordance with the invention is preferably implemented by programming an electronic sequence unit of the type illustrated in FIGS. 1 and 2 discussed above. The method of starting a gas turbine in accordance with the present invention is implemented by programming the microprocessor control contained in the electronic sequence unit or other controller of a gas turbine. Moreover, the method of starting a gas turbine in accordance with the present invention is utilized in conjunction with other prior art portions of a starting sequence which do not form part of the present invention.

In a preferred embodiment of the invention, the process of starting a gas turbine in accordance with the present invention occurs within the starting sequence of a gas turbine in which a first starting condition occurs when the speed of rotation of a rotor of the gas turbine is sensed to be greater than a first set speed, such as 14%, and in which a second starting condition occurs when the sensed speed of rotation of the turbine rotor reaches a second set speed greater than the first set speed, such as 50% of the normal operating speed of the rotor after the starting sequence of the gas turbine is completed. The invention utilizes cyclical turning on and off (pulse width modulation) of a main solenoid valve such as the valve 40 illustrated in FIG. 1 with a duty cycle such as, but not limited to, 25% on and 75% off to control the sensed exhaust gas temperature sensed by a thermocouple, such as thermocouple 30 in FIG. 1 between a first set temperature at which the main fuel valve is changed from being continually on to being cyclically turned on and off until the sensed exhaust gas temperature either falls to a second set temperature lower than the first set temperature or until a second starting condition is reached which is a second set speed of rotation of the turbine rotor. Preferably, although not limited thereto, the first set temperature for a turbine, such as that illustrated in FIGS. 1 and 2, is 1425° F. and the second set temperature is 1375° F. If the sensed exhaust gas temperature exceeds a maximum temperature at which the turbine may be operated, such as 1725° F. the electronic sequence unit, or controller, causes the main fuel valve to be turned off to prevent damage to the turbine during starting caused by excessive temperature.

Figure 3:
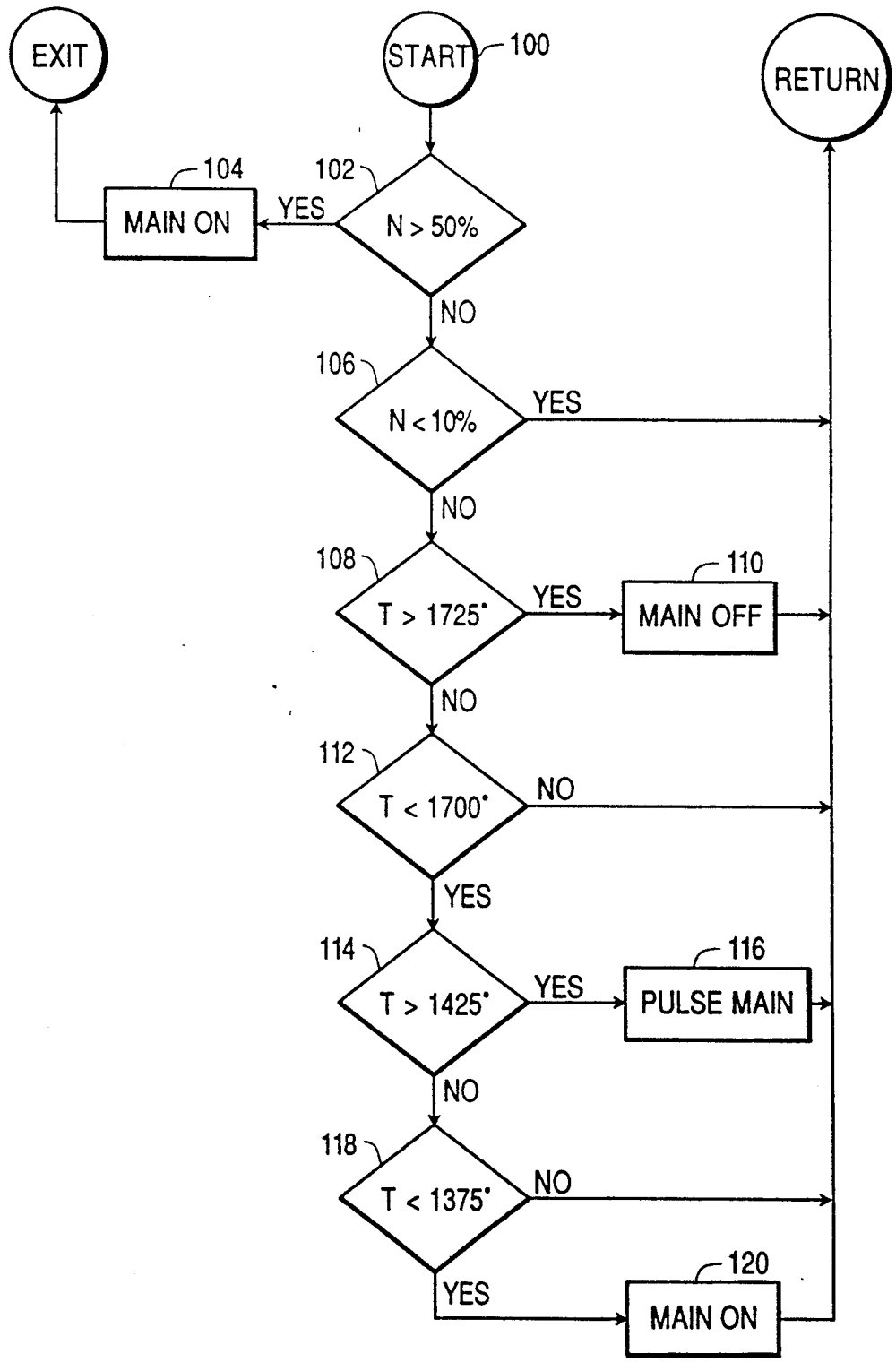
FIG. 3 illustrates a method of starting a gas turbine in accordance with the present invention.

A method of starting a gas turbine having a combustor, such as the combustor 12 of FIG. 1, and a fuel supply system supplying fuel to the combustor such as the fuel supply 14 of FIG. 1 is described with respect to FIG. 3 as follows. The first starting condition 100 occurs when the sensed speed of rotation of the rotor of the turbine is equal to or greater than a first set speed which may be 14% of the normal operating speed of the rotor of the turbine. The starting sequence proceeds to decision point 102 at which a determination is made if the sensed speed of operation of the rotor of the turbine is greater than 50% of the normal operating speed. If the answer is "yes", the main fuel valve 40 is changed from being pulsed to be continually turned on as indicated by block 104 and the starting sequence proceeds to EXIT which is another portion of the starting sequence for rotational speeds of the rotor of the turbine between 50% and 85% of operation speed of the turbine as in the prior art which forms no part of the present invention. If the answer is "no" at decision point 102, the starting sequence proceeds to decision point 106 at which the determination is made if the sensed rotational speed of the turbine rotor is less than 10%. If the answer is "yes" at decision point 106, the starting sequence proceeds to RETURN which will reenter this routine at start at the next data test loop. If the answer is "no" at decision point 106, the starting sequence proceeds to decision point 108 where a determination is made if the sensed exhaust gas temperature sensed by thermocouple 30 is greater than 1725° F. The 1725° F. temperature limit at decision point 108 is the maximum temperature at which the turbine may be continually operated without causing damage. If the answer is "yes" at decision point 108, the starting sequence proceeds to block 110 where the main fuel valve 40 is changed from being pulsed to be turned off to prevent a further rise in temperature in the sensed exhaust gas temperature. The starting sequence proceeds to RETURN as discussed above. If the answer is "no" at decision point 108, the starting sequence proceeds to decision point 112 where a determination is made if the sensed exhaust gas temperature sensed by thermocouple 30 is less than 1700° F. If the answer is "no" at decision point 112, the starting sequence proceeds to RETURN as discussed above. If the answer is "yes" at decision point 112, the starting sequence proceeds to decision point 114, where a determination is made if the sensed exhaust gas temperature is greater than 1425° F. If the answer is "yes" at decision point 114, the starting sequence proceeds to block 116 where the state of the main valve 40 is changed from being continually on to a state at which the fuel valve is cyclically switched on and off with a duty cycle such as, but not limited to, 25% on and 75% off. The temperature limit of 1425° F. is a first set temperature. If the answer is "no" at decision point 114, the starting sequence proceeds to decision point 118 where a determination is made if the sensed exhaust gas temperature sensed by thermocouple 30 is less than 1375° F. which is a second set temperature lower than the first set temperature. The hysteresis between the first set temperature of 1425° F. and the second lower set temperature of 1375° F. provides a temperature window between which the sensed exhaust gas temperature of the turbine is preferably operated to provide reliable cold starts and further prevents shutdown as occurring at block 110 described above during hot starts which may reduce thermal stress and result in longer life for the combustor 12 and turbine rotor 16. If the answer is "no" at decision point 118, the starting sequence proceeds to RETURN as discussed above. If the answer is "yes" at decision point 118, the starting sequence proceeds to block 120 where the state of the main fuel valve 40 is changed from being cyclically turned on and off, which was initiated at block 116, to being turned continually on. Block 120 insures that the sensed exhaust gas temperature sensed by thermocouple 30 is again brought up into the temperature window defined between the first set temperature of 1425° F. which is sensed at decision point 114 and the second set temperature of 1375° F. which is sensed at the decision point 118.

While the invention has been described in terms of its preferred embodiment, it should be understood that numerous modifications may be made thereto without departing from the spirit and scope of the invention as defined in the appended claims. For example, while a preferred application of the present invention is for starting a gas turbine driving an auxiliary power unit utilized in an airframe, it should be understood that the present invention may be utilized in starting gas turbines used in other fields of application. It is intended that all such modifications fall within the scope of the appended claims.

We claim:

1. A method of starting a gas turbine having a combustor and a fuel supplying system to the combustor comprising:
   cyclically turning a fuel valve on and off to control fuel flow to the combustor for combustion after a first starting condition is reached;
   cyclically sensing if an exhaust gas temperature is less than or greater than a first set temperature;
   if the exhaust gas temperature is greater than the first set temperature continuing the cyclical turning of the fuel valve on and off while cyclically testing if a second starting condition is reached; and
   if the exhaust gas temperature is less than the first set temperature continuing the cyclical turning of the fuel valve on and off until the exhaust gas temperature is sensed to be below a second set temperature lower than the first temperature at which time the fuel valve is turned continually on.

2. A method in accordance with claim 1 wherein:
   prior to turning on the fuel valve a starting fuel valve is turned on and an igniter is activated to initiate and maintain combustion in the combustor;
   the first starting condition is a first set speed of rotation of a rotor of the turbine and;
   the second starting condition is a second set speed of rotation which is greater than the first speed of rotation.

3. A method in accordance with claim 2 wherein:
   the fuel valve is turned off when a sensed exhaust gas temperature reaches a maximum set temperature at which the turbine may be operated.

4. A method in accordance with claim 1 wherein:
   when the sensed exhaust temperature falls below the second set temperature the fuel valve is turned continually on until the sensed exhaust gas temperature again rises to the first set temperature at which time the fuel valve is again cycled on and off or until the second starting condition is reached.

5. A method in accordance with claim 3 wherein:
the second starting condition is a set speed of rotation.

6. A method in accordance with claim 5 wherein:
the fuel valve is turned off when a sensed exhaust gas temperature reaches a maximum set temperature at which the turbine may be operated.

7. A method in accordance with claim 6 wherein:
the set speed of rotation of the second starting condition is a speed less than a speed at which the turbine is operated after starting.

8. A method in accordance with claim 4 wherein:
the fuel valve is turned off when a sensed exhaust gas temperature reaches a maximum set temperature at which the turbine may be operated.

9. A method in accordance with claim 5 wherein:
the set speed of rotation of the second starting condition is a speed less than a speed at which the turbine is operated after starting.

10. A method in accordance with claim 1 wherein:
the second starting condition is a set speed of rotation.

11. A method in accordance with claim 10 wherein:
the fuel valve is turned off when a sensed exhaust gas temperature reaches a maximum set temperature at which the turbine may be operated.

12. A method in accordance with claim 11 wherein:
the set speed of rotation of the second starting condition is a speed less than a speed at which the turbine is operated after starting.

13. A method in accordance with claim 10 wherein:
the set speed of rotation of the second starting condition is a speed less than a speed at which the turbine is operated after starting.

14. A method in accordance with claim 1 wherein:
the fuel valve is turned off when a sensed exhaust gas temperature reaches a maximum set temperature at which the turbine may be operated.

15. A gas turbine including a combustor and a fuel supply system comprising:
a controller for controlling starting of the gas turbine, the controller cyclically turning a fuel valve on and off to control fuel flow to the combustor for combustion after a first starting condition is reached, and the controller, in response to cyclically sensing if an exhaust gas temperature is greater than a first set temperature, controls the fuel valve to be cyclically turned on and off while cyclically testing if a second starting condition is reached and in response to cyclically sensing if the exhaust gas temperature is less then the first set temperature the controller controls the cyclical turning of the fuel valve on and off until the exhaust gas temperature is sensed to be below a second set temperature lower than the first temperature at which time the controller controls the fuel valve to be turned continually on.

16. A gas turbine in accordance with claim 15 wherein:
the controller, prior to turning on the fuel valve, controls turning on a starting valve and an igniter in the combustor; and
the first starting condition is a first set speed of rotation of a rotor of the turbine.

17. A gas turbine in accordance with claim 16 wherein:
the second starting condition is when a second set speed of rotation is sensed by a sensor which is communicated to the controller, which is greater than the first set speed of rotation.

18. A gas turbine in accordance with claim 17 wherein:
the controller controls the fuel valve to turn off when a sensed exhaust gas temperature reaches a maximum set temperature at which the turbine may be operated.

19. A gas turbine in accordance with claim 16 wherein:
the controller controls the fuel valve to turn off when a sensed exhaust gas temperature reaches a maximum set temperature at which the turbine may be operated.

20. A gas turbine in accordance with claim 15 wherein:
the controller controls the fuel valve when the second exhaust temperature falls below the second set temperature to be continually on until the sensed exhaust gas temperature again rises to the first exhaust gas temperature at which time the controller controls the fuel valve to again be turned on and off or until the second starting condition is reached.

21. A gas turbine in accordance with claim 20 wherein:
the second starting condition is when a set speed of rotation is sensed by a sensor which is communicated to the controller.

22. A gas turbine in accordance with claim 21 wherein:
the controller controls the fuel valve to turn off when a sensed exhaust gas temperature reaches a maximum set temperature at which the turbine may be operated.

23. A gas turbine in accordance with claim 20 wherein:
the controller controls the fuel valve to turn off when a sensed exhaust gas temperature reaches a maximum set temperature at which the turbine may be operated.

24. A gas turbine in accordance with claim 15 wherein:
the second starting condition is when a set speed of rotation is sensed by a sensor which is communicated to the controller.

25. A gas turbine in accordance with claim 24 wherein:
the controller controls the fuel valve to turn off when a sensed exhaust gas temperature reaches a maximum set temperature at which the turbine may be operated.

26. A gas turbine in accordance with claim 24 wherein:
the set speed of rotation of the second starting condition is a speed less than a speed at which the turbine is operated after starting.

27. A gas turbine in accordance with claim 15 wherein:
the controller controls the fuel valve to turn off when a sensed exhaust gas temperature reaches a maximum set temperature at which the turbine may be operated.

* * * * *